United States Patent
Szailer et al.

(10) Patent No.: US 9,581,099 B1
(45) Date of Patent: Feb. 28, 2017

(54) METHOD FOR DIAGNOSING SCR CATALYST AND FEED GAS QUALITY IN A DIESEL AFTER-TREATMENT SYSTEM

(71) Applicant: FEV NORTH AMERICA, INC., Auburn Hills, MI (US)

(72) Inventors: Tamas Szailer, Clarkston, MI (US); Harsha Nanjundaswamy, Rochester Hills, MI (US); Joel Deussen, Hartland, MI (US); Dean Tomazic, Orion Township, MI (US)

(73) Assignee: FEV North America, Inc., Auburn Hills, MI (US)

( * ) Notice: Subject to any disclaimer, the term of this patent is extended or adjusted under 35 U.S.C. 154(b) by 41 days.

(21) Appl. No.: 14/828,867

(22) Filed: Aug. 18, 2015

(51) Int. Cl.

| | | |
|---|---|---|
| *F02D 41/00* | (2006.01) | |
| *F01N 3/00* | (2006.01) | |
| *F01N 3/10* | (2006.01) | |
| *F02D 41/02* | (2006.01) | |
| *F01N 3/035* | (2006.01) | |
| *F01N 3/20* | (2006.01) | |
| *F01N 9/00* | (2006.01) | |
| *F01N 11/00* | (2006.01) | |
| *F01N 13/00* | (2010.01) | |

(52) U.S. Cl.
CPC .......... *F02D 41/029* (2013.01); *F01N 3/035* (2013.01); *F01N 3/103* (2013.01); *F01N 3/2066* (2013.01); *F01N 9/002* (2013.01); *F01N 11/007* (2013.01); *F01N 13/008* (2013.01); *F01N 2550/02* (2013.01); *F01N 2550/04* (2013.01); *F01N 2560/026* (2013.01); *F01N 2610/02* (2013.01); *F01N 2900/0408* (2013.01); *F01N 2900/1402* (2013.01)

(58) Field of Classification Search
CPC ........ F02D 41/029; F01N 3/035; F01N 3/103; F01N 3/2066; F01N 9/002; F01N 11/007; F01N 13/008; F01N 2560/026; F01N 2610/02; F01N 2550/04; F01N 2550/02; F01N 2900/0408; F01N 2900/1402
See application file for complete search history.

(56) References Cited

U.S. PATENT DOCUMENTS

| | | |
|---|---|---|
| 8,869,513 B2 | 10/2014 | Levijoki et al. |
| 8,910,466 B2 | 12/2014 | Kowalkowski et al. |
| 2010/0242440 A1 | 9/2010 | Garimella et al. |
| 2013/0152545 A1 | 6/2013 | Chavannavar |

*Primary Examiner* — Thomas Denion
*Assistant Examiner* — Brandon Lee
(74) *Attorney, Agent, or Firm* — Dinsmore & Shohl LLP

(57) ABSTRACT

An exhaust diagnostic system. The system includes a diesel engine having an exhaust system with a diesel particulate filter (DPF), a diesel oxidation catalyst (DOC), a selective catalytic reduction (SCR) catalyst, a first NOx sensor located upstream of the SCR catalyst and a second NOx sensor located downstream of the SCR catalyst. In addition, an engine control unit (ECU) is in electronic communication with the first NOx sensor and the second NOx sensor. An SCR coordinator can be included and be configured to execute a non-intrusive SCR deNOx efficiency test, an intrusive SCR/DOC deNOx efficiency test and an intrusive DOC non-methane hydrocarbon (NMHC) conversion efficiency test on the exhaust system. As a result of the conversion efficiency tests, a distinction can be made as to whether the SCR catalyst or DOC is failing.

15 Claims, 3 Drawing Sheets

METHOD FOR DIAGNOSING SCR CATALYST AND FEED GAS QUALITY IN A DIESEL AFTER-TREATMENT SYSTEM

FIELD OF THE INVENTION

The instant application is directed to an exhaust diagnostic system for a diesel engine, and in particular to an exhaust diagnostic system for a diesel engine that is configured to determine whether an SCR catalyst or a DOC catalyst is failing.

BACKGROUND OF THE INVENTION

Legislation and statutory regulations require self-monitoring capabilities, for example onboard diagnosis, to monitor motor vehicle emissions of hydrocarbons, carbon monoxide, nitrogen oxide, particulates, and the like. In addition, MY15 medium-duty California Air Resources Board (CARB) onboard diagnostics (OBD) regulatory requirements require a worst-case diesel oxidation catalyst (DOC) threshold event in tailpipe emissions to fall within regulatory tailpipe limits. As such, a robust diagnostic method to diagnose selective catalytic reduction (SCR) catalyst feed gas quality in order to detect a failed DOC before tailpipe NOx emissions exceed regulatory limits would be desirable.

SUMMARY OF THE INVENTION

An exhaust diagnostic system for a diesel engine is provided. The system includes a diesel engine having an exhaust system with a diesel particulate filter (DPF), a diesel oxidation catalyst (DOC), and a selective catalytic reduction (SCR) catalyst. During operation, the diesel engine generates exhaust gas and the exhaust gas flows through the exhaust system. The system also includes a first NOx sensor located upstream of the SCR catalyst and a second NOx sensor located downstream of the SCR catalyst. In addition, an engine control unit (ECU) is in electronic communication with the first NOx sensor, the second NOx sensor and an SCR coordinator.

The SCR coordinator can be configured to execute a non-intrusive SCR deNOx efficiency test, an intrusive SCR/DOC deNOx efficiency test and a DOC non-methane hydrocarbon (NMHC) conversion efficiency test on the exhaust system. The SCR coordinator can execute the intrusive SCR/DOC deNOx efficiency test when the non-intrusive SCR deNOx efficiency test determines an exhaust system deNOx efficiency below a first predetermined threshold. Also, the SCR coordinator can execute the intrusive DOC non-methane hydrocarbon (NMHC) conversion efficiency test when the intrusive SCR/DOC deNOx efficiency test determines an exhaust system deNOx efficiency below a second predetermined threshold. It is appreciated that the ECU can be in electronic communication with the SCR coordinator and command the SCR coordinator when and which efficiency test is to be executed.

Upon completion of the DOC NMHC conversion efficiency test, the ECU is configured to determine whether the SCR catalyst or the DOC is degrading or failing. For example, when the intrusive DOC NMHC conversion efficiency test determines an exhaust system deNOx efficiency is not below a third predetermined threshold, the ECU can determine that the SCR catalyst is not operating properly. In the alternative, when the intrusive DOC NMHC conversion efficiency test determines the exhaust system deNOx efficiency is below the third predetermined threshold, the ECU can determine that the DOC is not operating properly.

In some instances, the intrusive SCR/DOC deNOx efficiency test is executed with a DPF exit exhaust gas temperature in the range between 350-400° C. Preferably, the intrusive SCR/DOC deNOx efficiency test is executed with the DPF exit exhaust gas in a temperature range between 355-385° C., and more preferably with the DPF exit exhaust gas temperature between 365-375° C.

With respect to the intrusive DOC NMHC efficiency test, the test can be executed with a DPF exit exhaust gas temperature between 250-350° C. Preferably, the intrusive DOC NMHC efficiency test is executed using a DPF exit exhaust gas temperature between 275-325° C., and more preferably with the DPF exit exhaust gas temperature between 295-305° C.

It is appreciated that the deNOx efficiencies during the non-intrusive SCR deNOx efficiency test, intrusive SCR/DOC deNOx efficiency test, and intrusive DOC NMHC conversion efficiency test are determined using the first NOx sensor and the second NOx sensor. In some instances, the second NOx sensor determines an exhaust NOx concentration during a steady state temperature stage of the exhaust gas after the DPF regeneration event. In other instances, the second NOx sensor determines the exhaust NOx concentration during a transient temperature stage of the exhaust gas after the DPF regeneration event.

A process for diagnosing a diesel engine exhaust system includes providing the exhaust diagnostic system discussed above and operating the diesel engine such that engine exhaust gas flows through the exhaust system. During operation of the diesel engine, a non-intrusive SCR deNOx efficiency test is executed on the exhaust system and it is determined whether or not the NOx content of the exhaust gas exiting the exhaust system is below a first predetermined threshold. In the event that the deNOx efficiency does fall below the first predetermined threshold, the DPF is regenerated and an intrusive SCR/DOC conversion efficiency test is executed on the exhaust system. Then, it is determined if the deNOx efficiency of the exhaust system is below a second predetermined threshold as a result of the intrusive SCR/DOC conversion efficiency test. In the event that the deNOx efficiency of the exhaust system is below the second predetermined threshold, the process executes an intrusive DOC NMHC conversion efficiency test on the exhaust system. Thereafter, the process determines if the deNOx efficiency of the exhaust system is below a third predetermined threshold. If the deNOx efficiency is below the third predetermined threshold, the process determines that the SCR catalyst is failing. In the alternative, if the deNOx efficiency is not below the third predetermined threshold, the process determines that the feed gas quality of the exhaust gas supplied to the SCR catalyst is degrading and thus the DOC is failing.

DETAILED DESCRIPTION OF THE INVENTION

Figure 1:
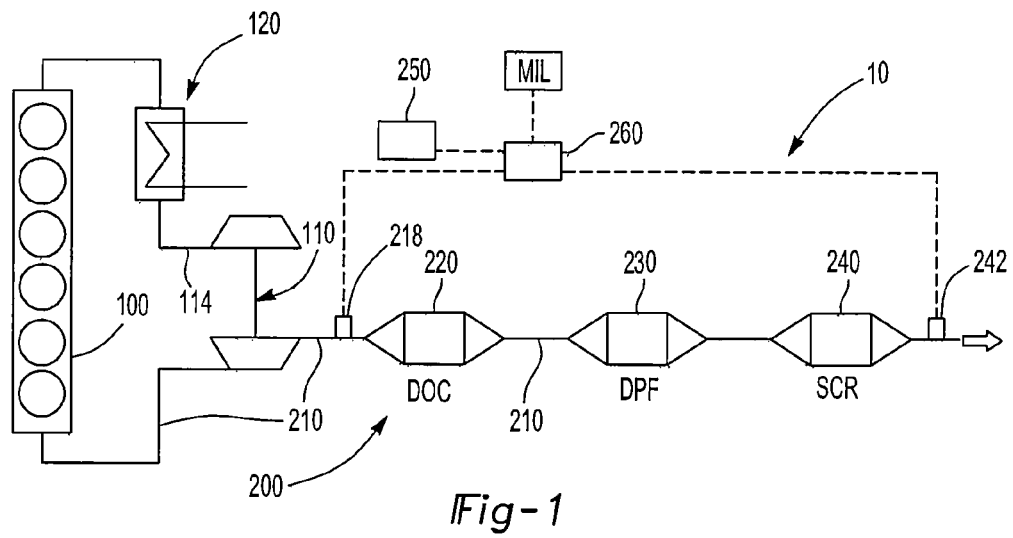
FIG. 1 is a schematic illustration of a diesel engine with an exhaust system and an exhaust diagnostic system according to an embodiment disclosed herein.

An exhaust diagnostic system for a diesel engine and a process for diagnosing a diesel engine exhaust system is provided. Both the exhaust diagnostic system and the process include a diesel engine with an exhaust system that has a diesel particulate filter (DPF), a diesel oxidation catalyst (DOC), a selective catalytic reduction (SCR) catalyst, a first NOx sensor located upstream of the SCR catalyst, and a second NOx sensor located downstream from the SCR catalyst. An engine control unit (ECU) in electronic communication with the first and second NOx sensors is also included.

A series of efficiency tests on the exhaust system can be executed, for example using an SCR coordinator. A non-intrusive SCR catalyst deNOx efficiency test can be executed on the exhaust system in order to determine if the deNOx efficiency of the exhaust system is below a first predetermined threshold. In the event that the deNOx efficiency of the exhaust system is below the first predetermined threshold, additional testing can be executed. In some instances, the ECU can afford for regeneration of the DPF before additional efficiency tests on the exhaust system is performed. It is appreciated that regeneration of the DPF cleans, removes, and oxidizes any sulfur that is on the SCR catalyst; cleans and removes diesel exhaust fluid (DEF) deposits such as urea deposits from the SCR catalyst; and also cleans adsorbed hydrocarbons from the SCR catalyst. As such, the SCR catalyst has a very well defined starting point or state after the DPF regeneration.

In some instances, DEF dosing of the exhaust gas can be included after the DPF regeneration in order to ensure that exhaust gas reaching the SCR catalyst has a given and desired quality. It is appreciated that the term "quality" as used herein refers to a desired exhaust gas composition and/or concentration of specific exhaust gas components such as $CO_2$, NO, $NO_2$, NMHC, etc.

After the DPF regeneration event, and assuming that the non-intrusive SCR deNOx efficiency test determines the deNOx efficiency of the exhaust system is below the first predetermined threshold, an intrusive SCR/DOC deNOx efficiency test is executed. It is appreciated that the term "intrusive" refers to the ECU forcing the engine and the exhaust system into a physical state with respect to temperature, exhaust flow, engine exiting NOx concentration, etc. such that a well-defined state is present for the exhaust system and the ECU can make a robust decision. Stated differently, the use of an intrusive efficiency test removes one or more variables such as temperature fluctuation, exhaust flow fluctuation, etc. such that a well-defined state of the exhaust system is present and a determination for a cause of low deNOx efficiency can be determined. This is in contrast to a non-intrusive efficiency test in which a monitor or sensor passively measures an effective NOx reduction in the exhaust system without any control provided to the normal operation of the diesel engine.

After the intrusive SCR/DOC deNOx efficiency test has been executed, whether or not the deNOx efficiency of the exhaust system is below a second predetermined threshold is determined. In the event that the deNOx efficiency of the exhaust system is not below a second predetermined threshold, no further action is required and the process can return to executing non-intrusive SCR deNOx efficiency tests. In the alternative, and when the deNOx efficiency of the exhaust system is determined to be below the second predetermined threshold via the intrusive SCR/DOC deNOx efficiency test, an additional intrusive test, in particular a DOC NMHC conversion efficiency test, is executed. In the event that the intrusive DOC NMHC conversion efficiency test determines the deNOx efficiency of the exhaust system is below a third predetermined threshold, it can be determined that the SCR catalyst is operating properly but that the DOC is failing and exhaust gas quality to the SCR is less than desirable. In the alternative, if the intrusive DOC NMHC conversion efficiency test determines the deNOx efficiency of the exhaust system is not below the third predetermined threshold, then it can be determined that the DOC is operating properly but that the SCR catalyst is degrading and may need repair.

Each of the intrusive efficiency tests can be executed within a predefined temperature range. In particular, the intrusive SCR/DOC deNOx efficiency test can be executed within a temperature range that affords for separation between good and failing SCR catalysts. Typical SCR catalysts exhibit maximum NOx reduction efficiency between 250-350° C. and minimal ammonia ($NH_3$) storage at temperatures above 400° C. As such, the intrusive SCR/DOC deNOx efficiency test can be executed with the exit exhaust gas temperature from the DPF controlled to be between 350-400° C., preferably between 355-385° C., and more preferably between 365-375° C. With respect to the intrusive DOC NMHC efficiency test, typical SCR catalysts have their highest $NH_3$ storage capacity at approximately 200° C. However, in order to execute a practical test, the SCR catalyst should have a measurable storage capacity, which occurs at temperatures below 350° C., but also be saturated within a relatively short time period. Therefore, the DOC NMHC efficiency test should be executed with an exhaust gas temperature from the DPF being between 250-350° C., preferably between 275-325° C., and more preferably between 295-305° C.

In this manner, the combination of the intrusive SCR/DOC deNOx efficiency test and the intrusive DOC NMHC efficiency test affords for onboard diagnostics (OBD) to determine if the SCR catalyst is failing, or in the alternative if poor quality feed gas is reaching the SCR catalyst and thus the DOC is failing.

Turning now to FIG. 1, an embodiment of an exhaust system and an exhaust diagnostic system according to an embodiment disclosed herein is shown generally at reference numeral 10. The system 10 includes exhaust ducting 200 in fluid communication with an internal combustion engine 100, such as a diesel engine. In some instances, the internal combustion engine in the form of a diesel engine can have a turbocharger 110 and an intercooler 120; however, this is not required. It is appreciated that the system 10 can include additional components, features, etc. as is known to those skilled in the art.

The exhaust ducting 200 can have a main exhaust duct 210, a DOC 220, a DPF 230, and an SCR catalyst 240. It is appreciated that exhaust gas exits the engine 100 through the main exhaust duct 210 and flows or travels to a pressure sink 1. A NOx sensor 218 is located upstream from the SCR catalyst 240 and another NOx sensor 242 is located downstream from the SCR catalyst 240. In some instances, the NOx sensor 218 is located upstream of the DOC 220.

Also included in the system 10 can be an SCR coordinator 250 and an ECU 260. The SCR coordinator is in electrical or electronic communication with the ECU 260, and the ECU 260 is in communication with both of the NOx sensors 218, 242. It is appreciated that the ECU 260 can routinely execute non-intrusive SCR deNOx efficiency tests on the exhaust system using the pair of NOx sensors 218, 242. It is also appreciated that the ECU 260 can afford for a DPF regeneration event as known to those skilled in the art. For example and for illustrative purposes only, the ECU 260 can result in heating of the DPF 230 such that carbon particulates are oxidized, as are other impurities such as sulfur and the like. The heating of the DPF 230 can occur through operation of the internal combustion engine in a lean state such that excess oxygen passes through the DPF 230 and oxidizes carbon deposits via an exothermal reaction. In the alternative, the DPF 230 can have a heater, e.g. an electrical heater, which when sufficient current is passed through the heater results in heating of the DPF 230 and thus oxidation of any carbon, sulfur, etc. deposits on or within the DPF 230.

Figure 2:
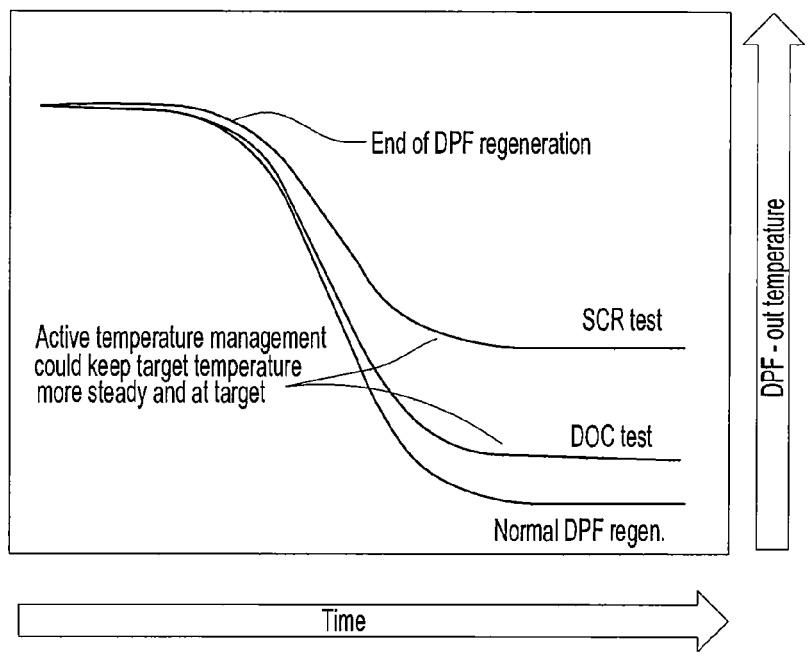
FIG. 2 is a graphical illustration of time versus DPF exit exhaust gas temperature after a DPF regeneration event for a normal DPF regeneration exhaust gas time-temperature regime, an intrusive DOC NMHC conversion efficiency test time-temperature regime, and an SCR deNOx efficiency test time-temperature regime.

FIG. 2 provides a graphical representation of time versus temperature for exhaust gas exiting DPF 230. The upper left portion of the graph 2 illustrates the temperature for exhaust gas exiting the DPF 230 during the DPF regeneration event. As the DPF regeneration event ends, the temperature of the exhaust gas exiting the DPF 230 decreases over time until reaching a generally steady state temperature regime (slope=0). However, active temperature management, i.e. intrusive control, can provide exhaust gas exiting the DPF 230 and entering the SCR catalyst 240 to be within a desired temperature range. In this manner, a desired steady state condition of the SCR catalyst can be obtained.

For example, the middle curve shown in FIG. 2 illustrates a desired temperature regime for the intrusive DOC NMHC conversion efficiency test. It is appreciated that this test or temperature regime is designed for the SCR catalyst to have a measurable storage capacity of $NH_3$ and yet be $NH_3$ saturated in a relatively short time period. In addition, the upper curve in FIG. 2 illustrates a desired temperature regime for the intrusive SCR/DOC deNOx efficiency test where there is a compromise between maximum NOx reduction efficiency of the SCR catalyst and minimal $NH_3$ storage capacity.

Figure 3:
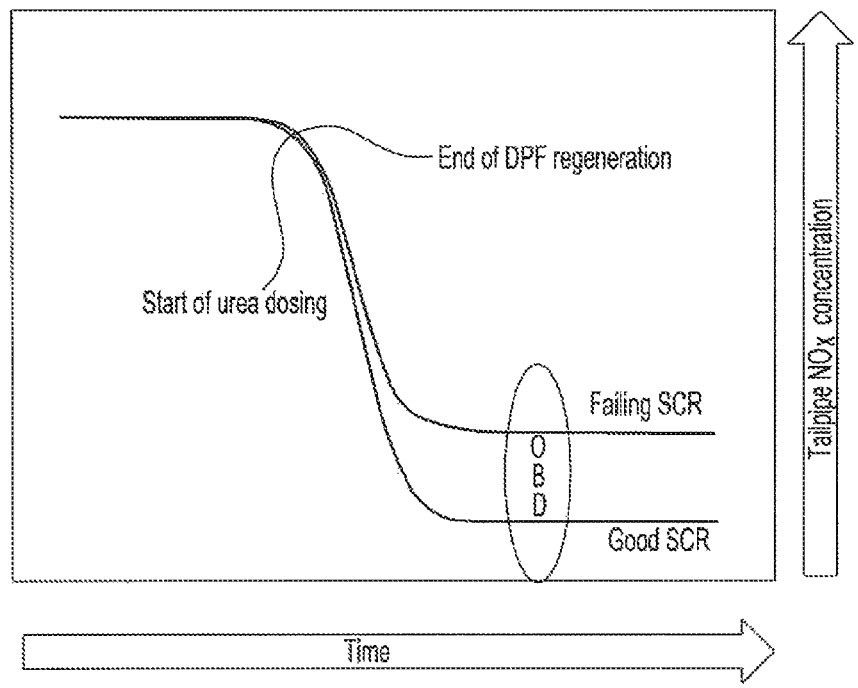
FIG. 3 is a graphical representation of time versus tailpipe NOx concentration after a DPF regeneration event in which optional urea dosing occurs and onboard diagnostics (OBD) determines that an SCR catalyst is operating properly or an SCR catalyst is failing.

Turning now to FIG. 3, a graphical plot of time versus NOx concentration for exhaust gas exiting exhaust or tailpipe 210 is shown. As shown in the figure, urea dosing can be optionally applied. In addition, intrusive control of the exhaust gas exiting DPF 230 provides an exhaust gas temperature regime to allow for determination of whether or not the SCR catalyst 240 is operating properly. As such, it is appreciated that OBD via the ECU 260 can determine whether or not the SCR catalyst 240 is operating properly, needs repair, needs to be replaced, and the like.

Figure 4:
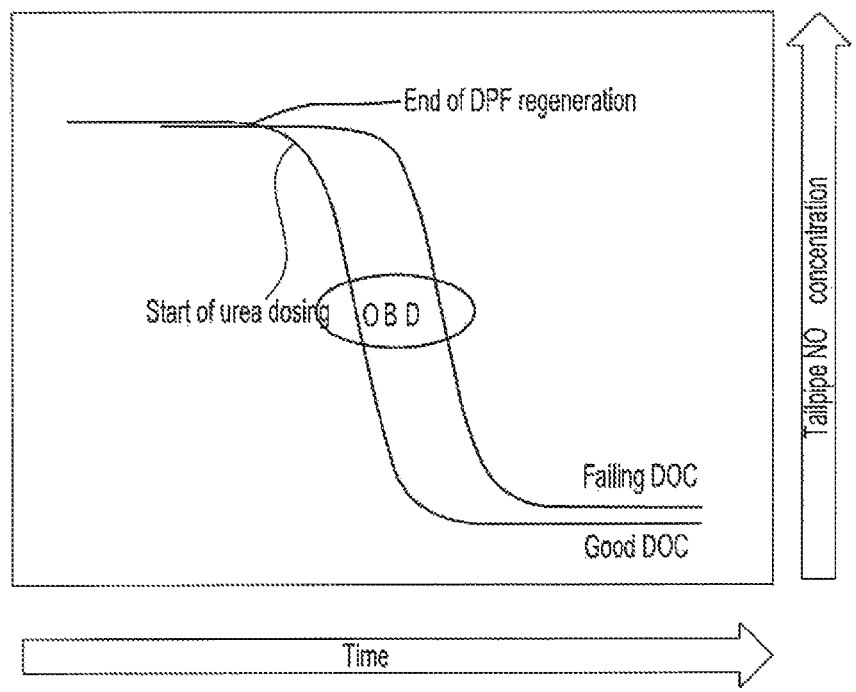
FIG. 4 is a graphical representation of time versus tailpipe NOx concentration after a DPF regeneration event in which optional urea dosing occurs and OBD determines that a DOC is operating properly or a DOC is failing.

FIG. 4 shows a similar graphical plot as shown in FIG. 3 except intrusive control is used to determine whether or not DOC 230 is operating properly. It is appreciated that the intrusive control puts the SCR catalyst 240 into a state such that exhaust gas quality reaching the SCR catalysts can be determined, e.g. within steady state temperature regime of approximately 300° C. In addition, the difference between a failing DOC and a good DOC is the time required for tailpipe NOx concentration to decrease to a steady state level. Stated differently, the time between the vertically sloped regions of the curves for the good DOC and the failing DOC shows is relatively large and OBD via the ECU 260 allows for the determination of a failing DOC.

Figure 5:
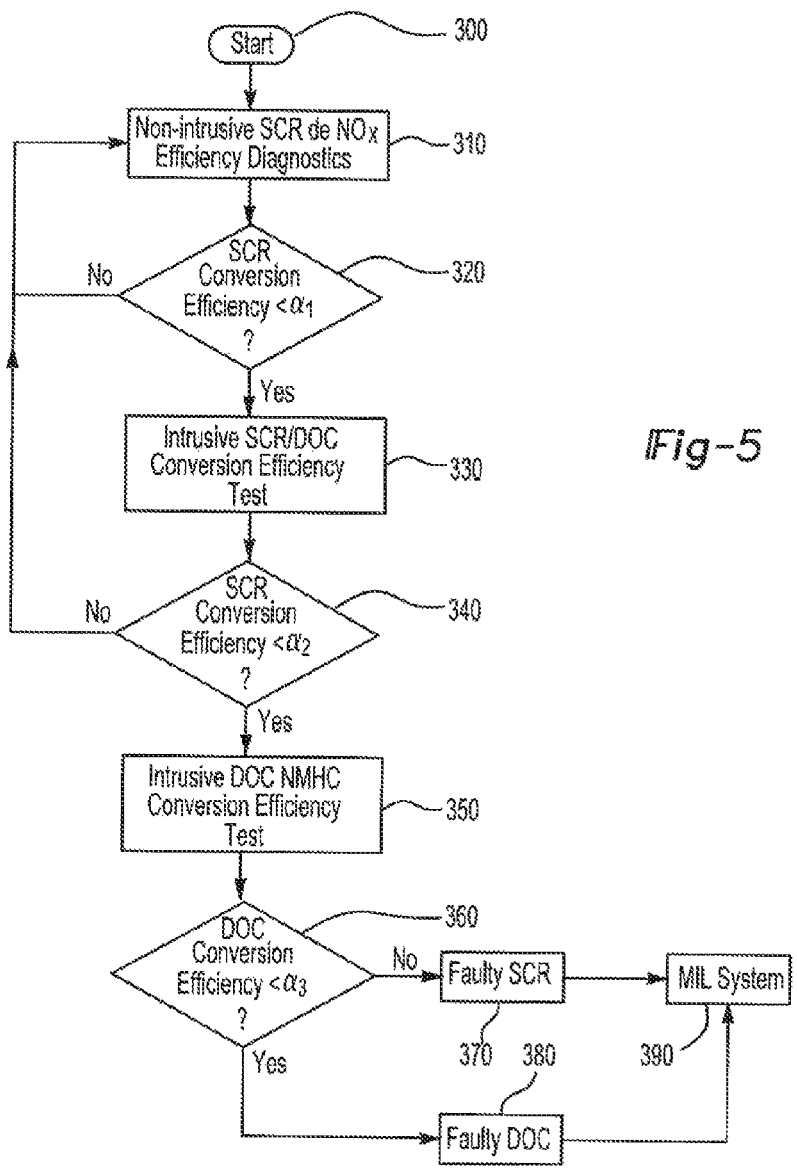
FIG. 5 is a schematic illustration of a process according to an embodiment disclosed herein.

Turning now to FIG. 5, an illustration of a process according to an embodiment disclosed herein is shown generally at reference numeral 30. The process 30 assumes that a diesel engine is operating and exhaust gas is passing through an exhaust system as illustratively shown in FIG. 1. The process starts at step 300 and a non-intrusive SCR deNOx efficiency test is executed at step 310. At step 320, whether or not the SCR conversion efficiency falls below a first predetermined threshold at is determined. If the SCR efficiency does not fall below $\alpha_1$, then the process proceeds back up to step 310 where additional non-intrusive SCR deNOx efficiency tests are executed as the diesel engine operates. In the event that the SCR conversion efficiency determined at step 320 does fall below $\alpha_1$, the process proceeds to step 330 where an intrusive SCR/DOC conversion efficiency test is executed.

The intrusive SCR/DOC conversion efficiency test is executed in a temperature regime in which the SCR catalyst has a relatively high NOx reduction efficiency and has a minimal $NH_3$ storage. Such a temperature regime can eliminate uncertainty related to ammonia storage prediction and enable quick diagnostic decision. Such factors can include a temperature regime for typical copper-zeolite (Cu—Z) SCR catalysts at temperatures between 350-400° C., preferably between 355-385° C., and more preferably between 365-375° C.

The ECU or another electronic device determines whether or not the SCR conversion efficiency is below a second predetermined threshold $\alpha_2$ at step 340. In the event that the SCR conversion efficiency does not fall below $\alpha_2$, the process returns back to step 310 where continual monitoring via the non-intrusive SCR deNOx efficiency test continues. In the alternative, if the SCR conversion efficiency at step 340 is determined to be below the threshold $\alpha_2$, the process proceeds to step 350 in which an intrusive DOC NMHC conversion efficiency test is executed.

The DOC conversion efficiency test is conducted within a temperature regime in which the SCR catalyst has a measurable $NH_3$ storage capacity and saturates in a relatively short time period. Such a temperature regime is afforded by exhaust gas exiting the DPF with a temperature between 250-350° C., preferably between 275-325° C., and more preferably between 295-305° C.

Once the process proceeds from step 340 to step 350, the system can be diagnosed to have a faulty SCR catalyst or a faulty DOC. The system and process diagnoses which component is faulty by determining a DOC conversion efficiency at step 360 and also determining whether or not the DOC conversion efficiency falls below a third predetermined threshold $\alpha_3$. In the event that the DOC conversion efficiency is not below $\alpha_3$, then the SCR catalyst has a high probability of failing or being defective, and at step 370 such a determination is signaled or communicated to a malfunction illumination light system 390. In the alternative, if the DOC conversion efficiency does fall below the threshold $\alpha_3$, then it is probable that the SCR catalyst is functioning properly but that the exhaust gas quality that reaches or passes through the SCR is poor and thus the DOC is failing and at step 380 such a determination is signaled or communicated to the MIL system at step 390.

It is appreciated that the MIL system 390 can provide a warning or alert light to an operator of the diesel engine that maintenance or repair is required. In addition, the MIL system 390 can store the signal resulting from step 360 such that during maintenance of the diesel engine such information can be communicated to an individual seeking to repair the diesel engine, a diagnostic system used to aid in repairing the diesel engine, and the like. In this manner, the inventive exhaust diagnostic system and process disclosed herein allows for analysis of an exhaust system in order to determine whether an SCR catalyst is operating outside of desired limits, or in the alternative, if it is the DOC which is not functioning properly. Naturally, such components can be repaired and/or replaced in order to ensure that a diesel engine associated therewith operates within desired guidelines.

Figure 6:
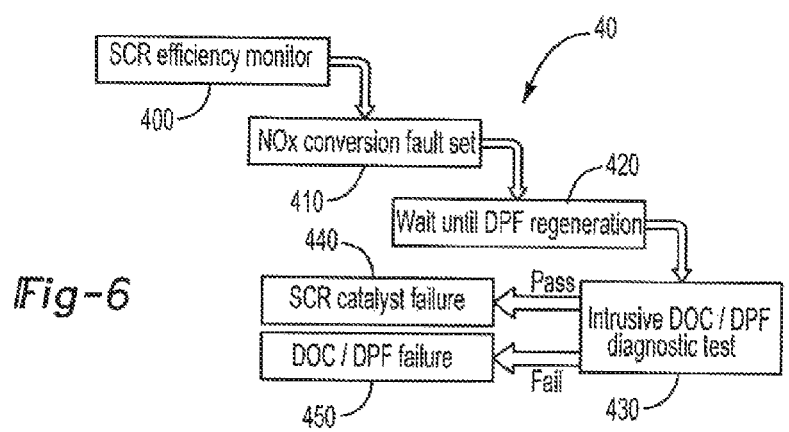
FIG. 6 is a schematic illustration of a process according to an embodiment disclosed herein.

FIG. 6 provides another illustration of the process at reference numeral 40. The process 40 includes providing a SCR efficiency monitor at step 400, which in turn monitors non-intrusive SCR deNOx efficiency of the exhaust system 10. In the event that a NOx conversion efficiency fault is triggered at step 410, the process 40 waits until the next DPF regeneration event at step 420. After the next DPF regeneration event has occurred, the process 40 executes an intrusive DOC/DPF diagnostic test at step 430. In the event that the intrusive DOC/DPF diagnostic test results in a DOC conversion efficiency that is more than or equal to a predetermined value, then the process determines that the SCR catalyst has failed or is failing at step 440. In the alternative, if the intrusive DOC/DPF diagnostic test results in a DOC conversion efficiency that is less than a predetermined value, then the process determines that the DOC has failed or is failing at step 450.

The above examples and embodiments described above are for illustrative purposes only and changes, modifications, etc. will occur to those skilled in the art that still fall within the scope of the invention. As such, it is the claims, and all equivalents thereof, that define the scope of the invention.

We claim:

1. An exhaust diagnostic system for a diesel engine, said system comprising:
a diesel engine having an exhaust system with a DPF, DOC and SCR catalyst, said diesel engine operable to supply exhaust gas to flow through said exhaust system;
a first NOx sensor located upstream of said SCR and a second NOx sensor located downstream of said SCR catalyst;
a malfunction indicator light (MIL) system;
an ECU in electronic communication with said first NOx sensor, said second NOx sensor and the MIL system;
said ECU configured to execute a non-intrusive SCR deNOx efficiency test on said exhaust system, said ECU also configured to execute an intrusive SCR/DOC deNOx efficiency test when said non-intrusive SCR deNOx efficiency is below a first predetermined threshold after a DPF regeneration event and an intrusive DOC NMHC conversion efficiency test when said intrusive SCR/DOC deNOx efficiency is below a second predetermined threshold on said exhaust system after said DPF regeneration event;
said ECU further configured to determine that said SCR is degrading when said intrusive DOC NMHC conversion efficiency test determines said DOC efficiency is not below a third predetermined threshold and to determine that said DOC is degrading when said intrusive DOC NMHC conversion efficiency test determines said DOC efficiency is below said third predetermined threshold and to signal the MIL system that the SCR is failing when the DOC NMHC conversion efficiency is below the third predetermined threshold and to signal the MIL system that the DOC is failing when the DOC NMHC conversion efficiency is not below the third predetermined threshold.

2. The exhaust diagnostic system of claim 1, wherein said intrusive SCR/DOC deNOx efficiency test is executed with a DPF exit exhaust gas temperature between 350-400° C.

3. The exhaust diagnostic system of claim 2, wherein said DPF exit exhaust gas temperature is between 355-385° C.

4. The exhaust diagnostic system of claim 3, wherein said DPF exit exhaust gas temperature is between 365-375° C.

5. The exhaust diagnostic system of claim 4, wherein said intrusive DOC NMHC efficiency test is executed with a DPF exit exhaust gas temperature between 250-350° C.

6. The exhaust diagnostic system of claim 5, wherein said DPF exit exhaust gas temperature is between 275-325° C.

7. The exhaust diagnostic system of claim 6, wherein said DPF exit exhaust gas temperature is between 295-305° C.

8. The exhaust diagnostic system of claim 7, wherein said second NOx sensor determines an exhaust NOx concentration during a steady state temperature stage of said exhaust gas after said DPF regeneration event.

9. The exhaust diagnostic system of claim 8, wherein said second NOx sensor determines an exhaust NOx concentration during a transient temperature stage of said exhaust gas after said DPF regeneration event.

10. A process for diagnosing a diesel engine exhaust system, the process comprising:
providing a diesel engine with an exhaust system, the diesel engine having an ECU, the exhaust system having a DPF, DOC, SCR, a first NOx sensor located upstream of the SCR and a second NOx sensor located downstream of the SCR, and a malfunction indicator light (MIL) system;
operating the diesel engine and flowing engine exhaust gas through the exhaust system;
executing a non-intrusive SCR deNQx efficiency test on the exhaust system;
determining when the SCR efficiency of the exhaust system is below a first predetermined threshold as a result of the non-intrusive SCR deNQx efficiency test;
regenerating the DPF;
executing an intrusive SCR/DOC conversion efficiency test on the exhaust system when the SCR efficiency of the exhaust system is below the first predetermined threshold;
determining when the SCR efficiency of the exhaust system is below a second predetermined threshold as a result of the intrusive SCR/DOC conversion efficiency test;
executing an intrusive DOC NMHC conversion efficiency test on the exhaust system when the SCR efficiency of the exhaust system is below the second predetermined threshold;
determining when the DOC NMHC conversion efficiency of the exhaust system is below a third predetermined threshold as a result of the DOC NMHC conversion efficiency test;
signaling the MIL system that the SCR is failing when the DOC NMHC conversion efficiency is below the third predetermined threshold and signaling the MIL system that the DOC is failing when the DOC NMHC conversion efficiency is not below the third predetermined threshold.

11. The process of claim 10, wherein the intrusive SCR/DOC conversion efficiency test includes controlling the temperature exhaust gas exiting the DPF to within a temperature range of 350-400° C.

12. The process of claim 11, wherein the temperature of the exhaust gas exiting the DPF is controlled within a temperature range of 360-380° C.

13. The process of claim 12, wherein the intrusive DOC NMHC conversion efficiency test includes controlling the temperature exhaust gas exiting the DPF to within a temperature range of 250-350° C.

14. The process of claim 13, wherein the temperature of the exhaust gas exiting the DPF is controlled within a temperature range of 390-310° C.

15. A process for diagnosing a diesel engine exhaust system, the process comprising:
providing a diesel engine with an exhaust system, the diesel engine having an ECU operable to execute diagnostics on the exhaust system and the exhaust system having a DPF, DOC, SCR, a first NOx sensor located upstream of the SCR and a second NOx sensor located downstream of the SCR;
operating the diesel engine and flowing engine exhaust gas through the exhaust system;
providing a malfunction indicator light (MIL) system operable to receive a signal from the ECU;
executing a non-intrusive SCR deNOx efficiency test on the exhaust system using the ECU;
determining when the SCR efficiency of the exhaust system is below a first predetermined threshold as a result of the non-intrusive SCR deNOx efficiency test;
executing a DPF regeneration event when the SCR efficiency is below the first predetermined threshold;
executing an intrusive SCR/DOC conversion efficiency test on the exhaust system using the ECU when the SCR efficiency of the exhaust system is below the first predetermined threshold and the DPF regeneration has been executed;
determining when the SCR, efficiency of the exhaust system is below a second predetermined threshold as a result of the intrusive SCR/DOC conversion efficiency test;
executing an intrusive DOC NMHC conversion efficiency test on the exhaust system using the ECU when the SCR efficiency of the exhaust system is below the second predetermined threshold;
determining when the DOC NMHC conversion efficiency of the exhaust system is below a third predetermined threshold as a result of the DOC NMHC conversion efficiency test;
signaling the MIL system that the SCR is a probable cause of the SCR efficiency of the exhaust system being below the second predetermined threshold when the DOC NMHC conversion efficiency is below the third predetermined threshold and signaling the MIL system that the DOC is the probable cause of the SCR efficiency of the exhaust system being below the second predetermined threshold when the DOC NMHC conversion efficiency is not below the third predetermined threshold.

* * * * *